(12) United States Patent
Chandezon et al.

(10) Patent No.: US 6,554,038 B2
(45) Date of Patent: Apr. 29, 2003

(54) TIRE HAVING A STRIATED BEAD PROTUBERANCE

(75) Inventors: Pierre Chandezon, Clermont-Ferrand (FR); Jean-Jacques Drieux, Volvic (FR); Olivier Muhlhoff, Clermont-Ferrand (FR)

(73) Assignee: Compagnie Générale des Etablissements Michelin - Michelin & Cie (FR)

( * ) Notice: Subject to any disclaimer, the term of this patent is extended or adjusted under 35 U.S.C. 154(b) by 1 day.

(21) Appl. No.: 09/727,642

(22) Filed: Dec. 1, 2000

(65) Prior Publication Data

US 2001/0006085 A1 Jul. 5, 2001

Related U.S. Application Data

(63) Continuation of application No. PCT/EP99/03345, filed on May 14, 1999.

(30) Foreign Application Priority Data

Jun. 5, 1998 (FR) ............................................. 98/07150

(51) Int. Cl.$^7$ ................................................ B60C 15/24
(52) U.S. Cl. ........................ 152/539; 152/523; 152/544
(58) Field of Search .............................. 152/523, 524, 152/525, 539, 544, 378 R, 379.3, 381.3, 381.4, 379.4, 379.5, 381.5, 381.6

(56) References Cited

U.S. PATENT DOCUMENTS

| | | | |
|---|---|---|---|
| 3,930,527 A | | 1/1976 | French |
| 3,983,920 A | * | 10/1976 | Gardner et al. ............. 152/522 |
| 4,034,792 A | * | 7/1977 | Martin .................... 152/379.3 |
| 4,057,092 A | * | 11/1977 | Tracy ...................... 152/379.3 |
| 4,155,393 A | | 5/1979 | Grawey |
| 5,538,059 A | * | 7/1996 | Brayer .................... 152/154.1 |
| 5,634,993 A | | 6/1997 | Drieux et al. |
| 5,971,047 A | | 10/1999 | Drieux et al. |

FOREIGN PATENT DOCUMENTS

| | | |
|---|---|---|
| FR | 2131874 | 11/1972 |
| FR | 2335360 | 7/1977 |
| FR | 2716645 | 9/1995 |
| JP | 10138718 | * 5/1998 |

* cited by examiner

*Primary Examiner*—Michael W. Ball
*Assistant Examiner*—Justin Fischer
(74) *Attorney, Agent, or Firm*—Baker Botts L.L.P.

(57) ABSTRACT

A tire having a radial carcass reinforcement of low H/S ratio, at least one bead provided with an axially outer protuberance, the maximum axial width of which is greater than the space taken up by the rim, characterized in that the protuberance is provided with incisions of a width other than zero, of a depth of at most 5 mm and arranged circumferentially parallel to each other.

4 Claims, 3 Drawing Sheets

TIRE HAVING A STRIATED BEAD PROTUBERANCE

This is a continuation of PCT/EP99/03345, filed May 14, 1999.

BACKGROUND OF THE INVENTION

The present invention relates to a tire having a radial carcass reinforcement, and more particularly to the sidewall and/or bead of such a tire.

French Patents FR 2 699 121 and FR 2 716 645 describe a tire having a radial carcass reinforcement of low H/S ratio, H being the height of the tire on its rim and S the maximum axial width thereof, which is intended to be mounted on a rim, at least one seat of which is inclined towards the outside and extended axially to the outside by a protrusion of low height. Said tire comprises at least one bead having the following characteristics:

a) the meridian profile of the center section of the carcass reinforcement is tangent to the anchoring bead wire of the carcass reinforcement at a point T such that the tangent TT' forms with a line parallel to the axis of rotation of the tire an angle Ø, which is open radially and axially towards the outside, of at least 70°, b) it is intended to be mounted on a rim such as described in the above patents, that is to say, one having the special characteristic of having at least one rim seat 42 inclined towards the outside, said seat 42 being extended axially to the inside either by a rim flange 44 or by the rim base on which is laid a tread bearing support, a lateral face of said support being used as the rim flange, and said seat being extended axially to the outside by a protrusion or hump 41 of low height;

c) the outer contour of the bead comprises (FIG. 1), axially to the inside, a wall 440 substantially perpendicular to the axis of rotation and may bear laterally on the axially inner flange 44 of the mounting rim J, said wall 440 of the bead B being extended axially to the outside by a frustoconical generatrix 430 which forms with a line parallel to the axis of rotation an angle γ of 45°, which is open axially towards the inside and radially towards the outside, said generatrix 430 itself being extended axially to the outside by a second frustoconical generatrix 420 of the bead seat forming with the direction of the axis of rotation an angle α of 15°, which is open axially towards the inside and radially towards the outside. Said generatrix 420 is said to be inclined towards the outside, its axially outer end being on a circle of diameter less than the diameter of the circle on which its axially inner end is located. A frustoconical generatrix 410, extending the generatrix 420 axially to the outside and forming with the direction of the axis of rotation an angle β of 45°, which is open axially and radially towards the outside, completes the contour of the base of the bead B. A wall 450, of general orientation substantially perpendicular to the direction of the axis of rotation of the tire, finishes off the contour of the bead B. Whereas the generatrix 420 will bear on the rim seat 42, which is inclined towards the outside, the generatrix 410 will bear on the axially inner wall of the protrusion or hump 41 of the rim J, which is inclined by the same angle β as the generatrix 410. The bead thus defined is a bead, the heel of which is arranged axially to the inside, whereas the toe of the bead is arranged axially to the outside.

As the axially outer wall 450 is shown, that is to say set back axially relative to the axially outermost end of the rim, the type of tire thus described has the special characteristic of not protecting the axially outermost metallic elements of the rim against attack due to curbs when traveling in towns. Said problem is solved by adapting the axially outer form of the toe of the bead, this adaptation in the present case resulting in covering the outer protruding edge of the rim with a greater or lesser mass or protuberance of rubber of a suitable quality, the maximum axial width of the outer contour of the toe of the bead being greater than the space taken up or maximum axial width of the mounting rim.

Although said axially outer protuberance of the bead perfectly protects the corresponding protrusion of the rim, on the other hand it is very sensitive firstly to abrasion when the tire rubs against the curb, and secondly to fragments of rubber being torn off following the initiation and propagation of cuts and/or breaks.

SUMMARY OF THE INVENTION

The aim of the present invention is to minimize the consequences of attack by curbs on said protuberance.

To this end, and according to the invention, the axially outer protuberance of the bead is provided with incisions of a width other than zero, of a depth of at most 5 mm and arranged circumferentially parallel to each other.

Preferably, the width of the incisions will be between 0.5 and 5 mm, and they will be inclined relative to the radial planes corresponding to them and passing through the axis of rotation of the tire. The incisions will also advantageously be separated circumferentially at a pitch of between 1 mm and 5 mm.

At the same time as the reduction in sliding between the outer wall of a protuberance owing to the presence of numerous thin pieces of rubber, it would appear that the propagation of the degradation of the rubber mass is minimized by said presence, which results in a very clear reduction in the visual perception of the damage caused.

The characteristics of the present invention will be better understood with reference to the following description, which refers to the drawings illustrating in non-limitative manner an embodiment of the invention:

DESCRIPTION OF PREFERRED EMBODIMENTS

Figure 1:
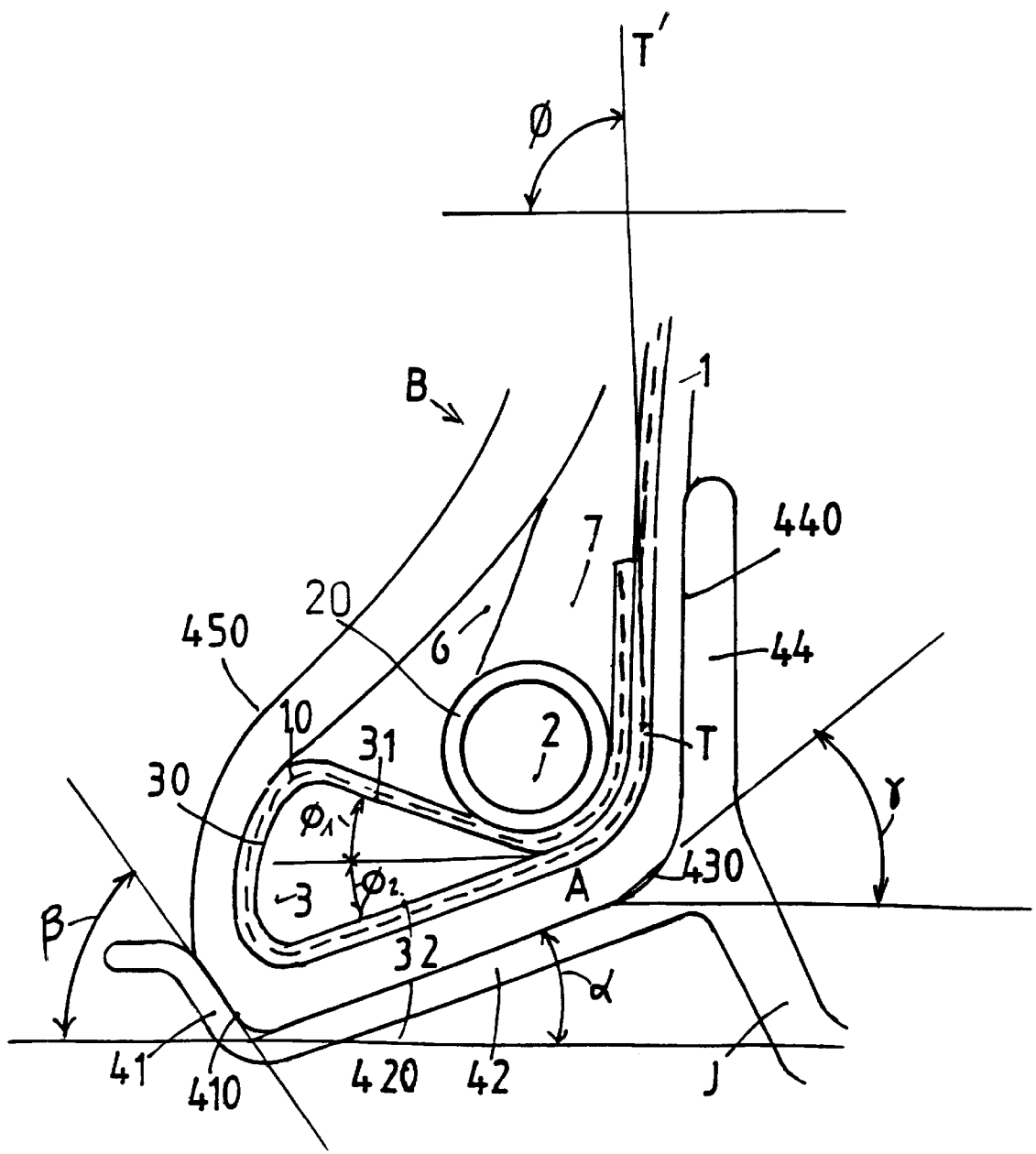
FIG. 1 is a diagram of a bead of the type covered by the invention.

The bead, which is shown in FIG. 1 and is as described in French Patents 2 699 121 and 2 716 645, comprises a carcass reinforcement 1, anchored within each bead B by winding around a bead wire 2, passing axially from the inside to the outside to form an upturn 10. The meridian profile of the center section of said carcass reinforcement in broken lines, which is composed in the example illustrated of a single ply of textile cables, is at a tangent to the bead wire 2 and the tangent TT' forms an angle Ø of 85° with a line parallel to the axis of rotation. The carcass reinforcement 1 is wound around the coated bead wire 2 to form an upturn 10 which entirely surrounds the contour of a profiled element 3 arranged axially to the outside of the anchoring bead wire 2 of the carcass reinforcement, said profiled element being in the form of a substantially circular sector having an apex or center A located radially beneath the bead wire 2, two sides or radii 31 and 32 starting from said apex A, and a third side 30, opposite the apex A, the radially outer side or radius 31 forming with a line parallel to the axis of rotation an angle $\emptyset_1$ of 45°, whereas the radially inner side or radius 32 forming with the same parallel line an angle $\emptyset_2$ of 15°, and said profiled element 3, which is finished off axially to the outside by the substantially circular side 30, being made of a rubber mix having in the vulcanized state a Shore A hardness of 94. The upturn 10 then forms firstly the radially inner side 32 of the profiled element 3, secondly the axially outer lateral side 30 of said profiled element, and finally the radially outer side 31 of the same profiled element, and then winds again around the bead wire 2, the end of said upturn being located radially above the bead wire 2.

The bead wire 2 coated with a rubber layer 20 is surmounted radially to the outside by a profiled element 7 of rubber mix of a Shore A hardness of 37. Radially to the outside of the profiled element 3 and axially to the outside of said profiled element 7 there is arranged a third profiled element 6 of rubber mix having a Shore A hardness equal to that of the profiled element 7 and therefore significantly less than the hardness of the mix of the profiled element 3.

Since the protrusion 41 of the rim J and the wall 450 of the bead B are axially to the outside, no effective protection is provided against scraping and impacts caused by curbs.

Figure 2:
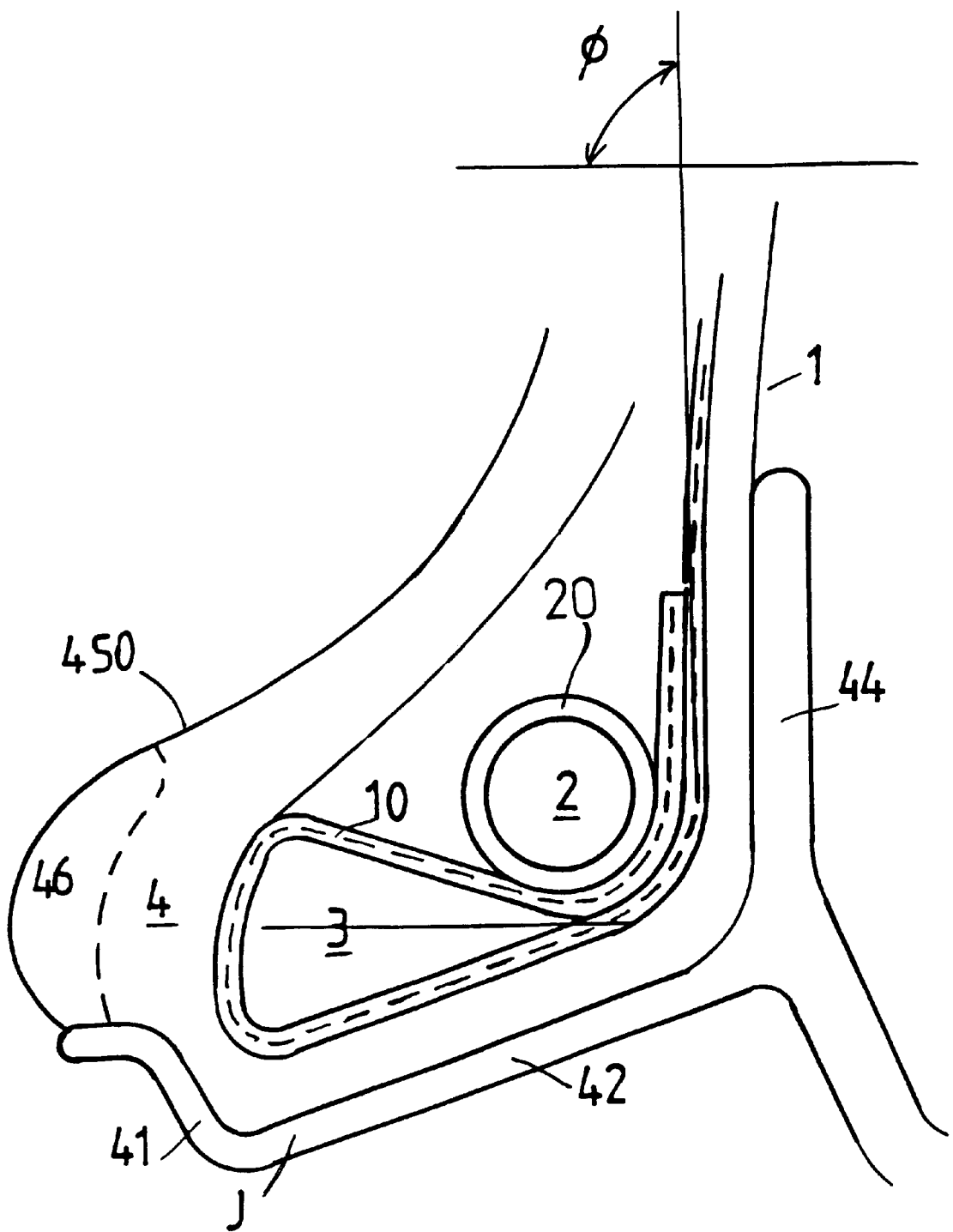
FIG. 2 is a diagram in meridian section of an improved bead according to the invention.
Figure 3:
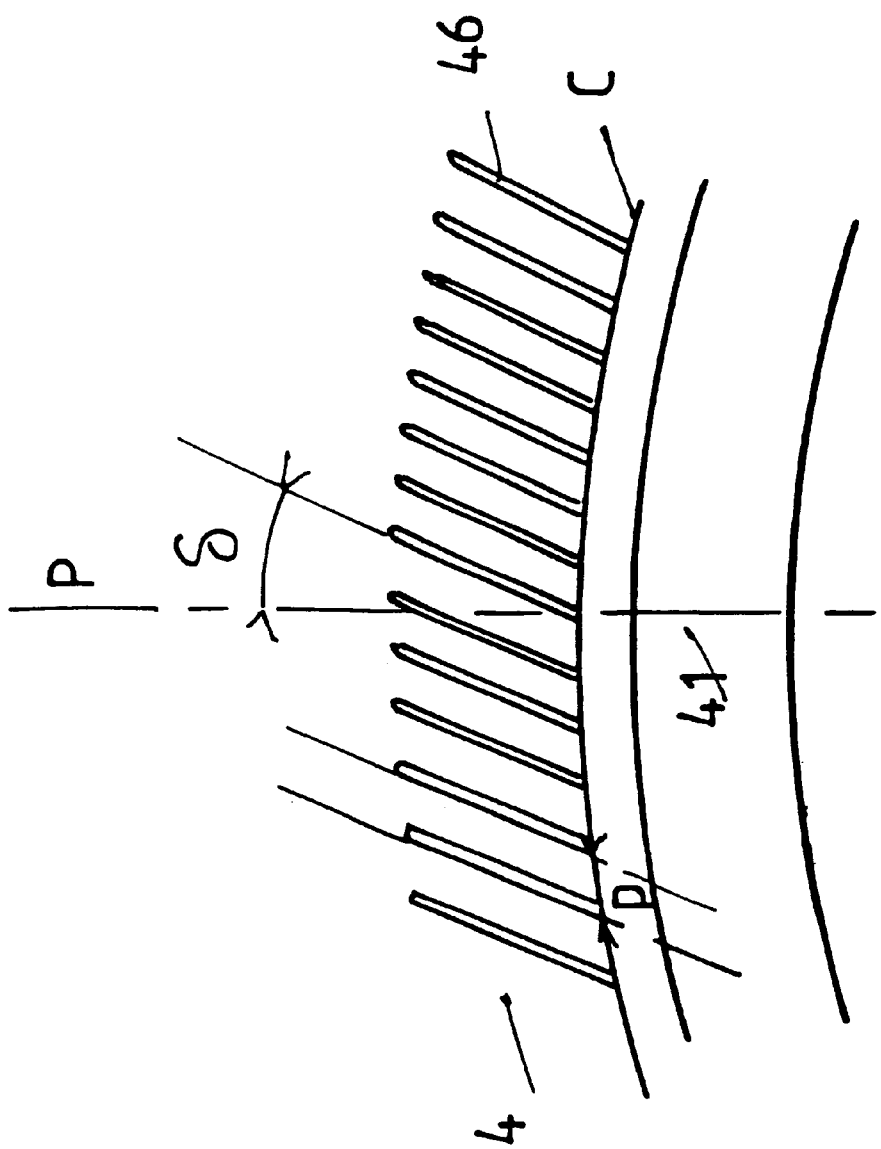
FIG. 3 is a front view of the bead of FIG. 2.

FIG. 2 shows an axially outer form 450 of a bead which has been modified and improved to the extent that said bead has a protuberance 4 which extends axially past the axially outer end of the mounting rim J. Said protuberance 4, which is of a preferably rounded outer form, protects the rim J by acting as a dampening shock-absorber. Said protuberance 4 is provided on its circumference with incisions 46 (FIG. 3) of a width other than zero, equal to 1.5 mm, which are inclined at an angle δ of 25° relative to the trace of the radial plane P passing through the lower end of an incision 46. They are arranged circumferentially, substantially parallel to each other, and at a pitch p, the pitch being the circumferential distance between two adjacent incisions measured on the circle C, the locus of all their radially inner ends, of 4 mm.

We claim:

1. A tire having a radial carcass reinforcement of low H/S ratio, which is intended to be mounted on a rim, at least one seat of which is inclined towards the outside and extended axially to the outside by a protrusion, and comprising at least one bead with an axially inner heel and an axially outer toe, having an axially outer protuberance, characterized in that said protuberance has a maximum axial width greater than the space taken up by the rim, and is provided with incisions of a width other than zero, of a depth of at most 5 mm and arranged circumferentially parallel to each other.

2. A tire according to claim 1, characterized in that the width of the incisions is between 0.5 and 5 mm.

3. A tire according to claim 1, characterized in that the incisions are inclined relative to radial planes corresponding to them and passing through the lower ends of the incisions.

4. A tire according to claim 1, characterized in that the incisions are arranged circumferentially, parallel to each other at a pitch of between 1 mm and 5 mm.

* * * * *